United States Patent
Means et al.

(10) Patent No.: US 11,368,355 B2
(45) Date of Patent: *Jun. 21, 2022

(54) METHOD FOR ESTABLISHING HIGH RESILIENT ACTIVE RECOVERY FOR BGP ROUTE REFLECTORS

(71) Applicant: AT&T Intellectual Property I, L.P., Atlanta, GA (US)

(72) Inventors: Israel Means, Chula Vista, CA (US); Praveen Ramadenu, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/984,530

(22) Filed: Aug. 4, 2020

(65) Prior Publication Data

US 2020/0412601 A1 Dec. 31, 2020

Related U.S. Application Data

(63) Continuation of application No. 16/418,353, filed on May 21, 2019, now Pat. No. 10,764,120.

(51) Int. Cl.
| | |
|---|---|
| *H04L 12/24* | (2006.01) |
| *H04L 12/713* | (2013.01) |
| *H04L 41/0668* | (2022.01) |
| *H04L 45/586* | (2022.01) |
| *H04L 41/0893* | (2022.01) |
| *H04L 41/0677* | (2022.01) |

(52) U.S. Cl.
CPC ...... *H04L 41/0668* (2013.01); *H04L 41/0677* (2013.01); *H04L 41/0893* (2013.01); *H04L 45/586* (2013.01)

(58) Field of Classification Search
CPC ............ H04L 41/0668; H04L 41/0677; H04L 41/0893; H04L 45/586
USPC .......................................................... 370/228
See application file for complete search history.

(56) References Cited

U.S. PATENT DOCUMENTS

| | | | |
|---|---|---|---|
| 7,675,912 B1 * | 3/2010 | Ward ...................... | H04L 45/04 370/392 |
| 8,537,840 B1 * | 9/2013 | Raszuk .................. | H04L 45/04 370/400 |
| 8,995,446 B2 * | 3/2015 | Patel ...................... | H04L 45/04 370/395.53 |
| 9,686,381 B1 * | 6/2017 | Singh .................. | H04L 67/2814 |
| 2004/0034702 A1 * | 2/2004 | He ...................... | H04L 12/4633 709/224 |

(Continued)

*Primary Examiner* — Candal Elpenord
(74) *Attorney, Agent, or Firm* — Guntin & Gust, PLC; Kenneth Kwan

(57) ABSTRACT

A recovery route reflector with a monitoring module and a BGP state establishment module is peered with a plurality of primary route reflectors. Each of the plurality of primary route reflectors is peered with a set of provider edge devices. The BGP state between the recovery route reflector and the plurality of primary route reflectors is periodically monitored. When a primary route reflector fails the BGP state between the recovery route reflector and the failed primary route reflectors is idle, and the recovery route reflector establishes a peer session with the provider edge devices that had been peered with the failed route reflector.

20 Claims, 4 Drawing Sheets

(56) References Cited

U.S. PATENT DOCUMENTS

| | | |
|---|---|---|
| 2005/0213498 A1 | 9/2005 | Appanna et al. |
| 2006/0227723 A1* | 10/2006 | Vasseur .................. H04L 45/28 370/254 |
| 2010/0080115 A1 | 4/2010 | Yang et al. |
| 2010/0080222 A1 | 4/2010 | Mohapatra et al. |
| 2014/0003227 A1 | 1/2014 | Scudder et al. |
| 2016/0248658 A1 | 8/2016 | Patel et al. |
| 2017/0054628 A1 | 2/2017 | Tomotaki et al. |
| 2018/0227212 A1 | 8/2018 | Ferguson et al. |

* cited by examiner

METHOD FOR ESTABLISHING HIGH RESILIENT ACTIVE RECOVERY FOR BGP ROUTE REFLECTORS

CROSS REFERENCE TO RELATED APPLICATIONS

This application is a continuation of, and claims priority to, U.S. patent application Ser. No. 16/418,353, filed May 21, 2019, entitled "Method For Establishing High Resilient Active Recovery For BGP Route Reflectors," the entire contents of which are hereby incorporated herein by reference.

TECHNICAL FIELD

The present disclosure relates to communicating network routing information. More particularly, the disclosure relates to a method, system, and computer program for establishing high resilient active recovery.

BACKGROUND

Border Gateway Protocol (BGP) is the routing protocol of the Internet. It is used to exchange routing information between Autonomous Systems (AS) and routing traffic across the Internet. Forwarding BGP updates within an AS introduces a couple of challenges. First, BGP requires a BGP router to add its own AS number (ASN) entry to the AS_PATH attribute when forwarding BGP route updates to another AS. The AS_Path attribute identifies the ASes through which an UPDATE message has passed and lists in reverse order the ASes traversed by a prefix, with the last AS placed at the beginning of the list. The primary purpose of AS_PATH is to provide loop-prevention during inter-AS routing. Second, to avoid routing loops, BGP drops a route if a BGP router sees its own ASN in the AS_PATH list. Thus, when forwarding a BGP route advertisement through the routers within an AS, each BGP edge router will add its own ASN to the AS_PATH list. But the next hop BGP router, which is in the same AS, sees its own ASN in the AS_PATH list, assumes that a loop has occurred and drops the route. Although this can be overcome by redistributing all BGP routes into an interior gateway protocol (IGP), and not using BGP, the large number of routes advertised by BGP can cause IGP to crash. To avoid this an internal BGP (iBGP) is used to forward route advertisements received from an external BGP router through the internal network. With iBGP, a router within an AS does not exchange routing updates to another iBGP router. The ASN is added and routes are advertised only when they are being sent to a BGP router in another autonomous system, i.e. to an eBGP router. However, because routing updates learned are not advertised to other iBGP peers to prevent loops, route reachability must be achieved by using a full-mesh topology between all the iBGP peers. This means that every device within an AS is logically connected to every other device through a peering relationship.

Deploying iBGP full-mesh topology can cause scalability issues in large networks. To exchange routing updates with all the other BGP routers in the full-mesh, each peering router uses up network resources. Additionally, to add new iBGP router network engineers must establish a connection to every other BGP router within the AS. This requires configuration changes on backbone routers, which results in network downtime. These problems may be avoided through the use of a Route Reflector (RR).

An RR is an iBGP feature that eliminates the need for a BGP full-mesh topology and allows iBGP to scale in large networks. The RR mechanism allows a iBGP router to act as a RR that advertises (reflects) the routes it learns from one iBGP router to other iBGP peers within the AS.

The internal peers that connect to an RR are classified as RR client peers. An RR along with its client peers form a cluster. Each cluster can have multiple RRs which helps avoid a single point of failure and achieve redundancy. It is also possible to have multiple RRs within an AS where each RR is a non-client peer to another RR.

RRs are critical components in large network functionality to support high scale. Large complex topologies require a large number of RRs to run the network and provide some protection from outage events. Traditionally, RRs were deployed in pairs to support some failover functions however dual-failures would result in service outages. To improve the resiliency more RRs can be deployed but this comes with a higher cost and functional challenge that drives up scale throughout the topology. Additionally, in virtual environment servers are taken out of service for planned maintenance frequently resulting in ongoing states where there is only one RR functioning. This exposes the network to more frequents service interruptions.

SUMMARY

One general aspect includes a method including: establishing a first peer session between a recovery RR and a first RR that has established a first provider edge peer session with a first set of provider edge devices. Establishing a second peer session between the recovery RR and a second RR that has established a second provider edge peer session with a second set of provider edge devices. Monitoring a BGP state between the first RR and the recovery RR and a BGP state between the second RR and the recovery RR. Establishing a peer session between the recovery RR and the first set of provider edge devices when the first RR fails and the first BGP state is idle. Other embodiments of this aspect include corresponding computer systems, apparatus, and computer programs recorded on one or more computer storage devices, each configured to perform the actions of the methods.

Implementations may include establishing a BGP SET in the recovery RR that manages a first provider edge BGP state between the recovery RR and the first set of provider edge devices. The BGP set may be a container that includes all neighbor configuration policies and parameters.

One general aspect includes a system including: a first RR and a second RR where the first RR has a set of established first provider edge peer sessions with a first set of provider edge devices, and the second RR has a set of established second peer sessions with a second set of provider edge devices. The system includes a recovery RR with an established first recovery RR peer session with the first RR and an established second recovery RR peer session with the second RR. The recovery RR includes a monitoring module in the that monitors a first BGP state between the first RR and the recovery RR and a second BGP state between the second RR and the recovery RR. The recovery RR includes a BGP state establishment module that establishes a peer session between the recovery RR and the first set of provide edge devices when the first BGP state is idle.

The recovery RR may include a BGP SET that manages a first provider edge BGP state between the recovery RR and the first set of provider edge devices. The BGP set may be a container that includes all neighbor configuration policies and parameters.

One general aspect includes a non-transitory computer readable storage medium storing an information processing program to cause a computer to execute a process including: establishing a first peer session between a recovery RR and a first RR where the first RR has established a first provider edge peer session with a first set of provider edge devices. The process executed by the computer further includes establishing a second peer session between the recovery RR and a second RR where the second RR has established a second provide edge peer session with a second set of provider edge devices. The process executed by the computer also includes monitoring a first BGP state between the first RR and the recovery RR and a second BGP state the second RR and the recovery RR; and when the first BGP state is idle, establishing a peer session between the recovery RR and the first set of provider edge devices.

In one embodiment, the non-transitory computer readable storage medium where the process executed by the computer may further includes establishing a BGP SET that manages a first provider edge BGP state between the recovery route reflector and the first set of provider edge devices. In an embodiment the BGP SET is a container that includes all neighbor configuration policies and parameters.

DETAILED DESCRIPTION OF ILLUSTRATIVE EMBODIMENTS

Glossary

Figure 1:
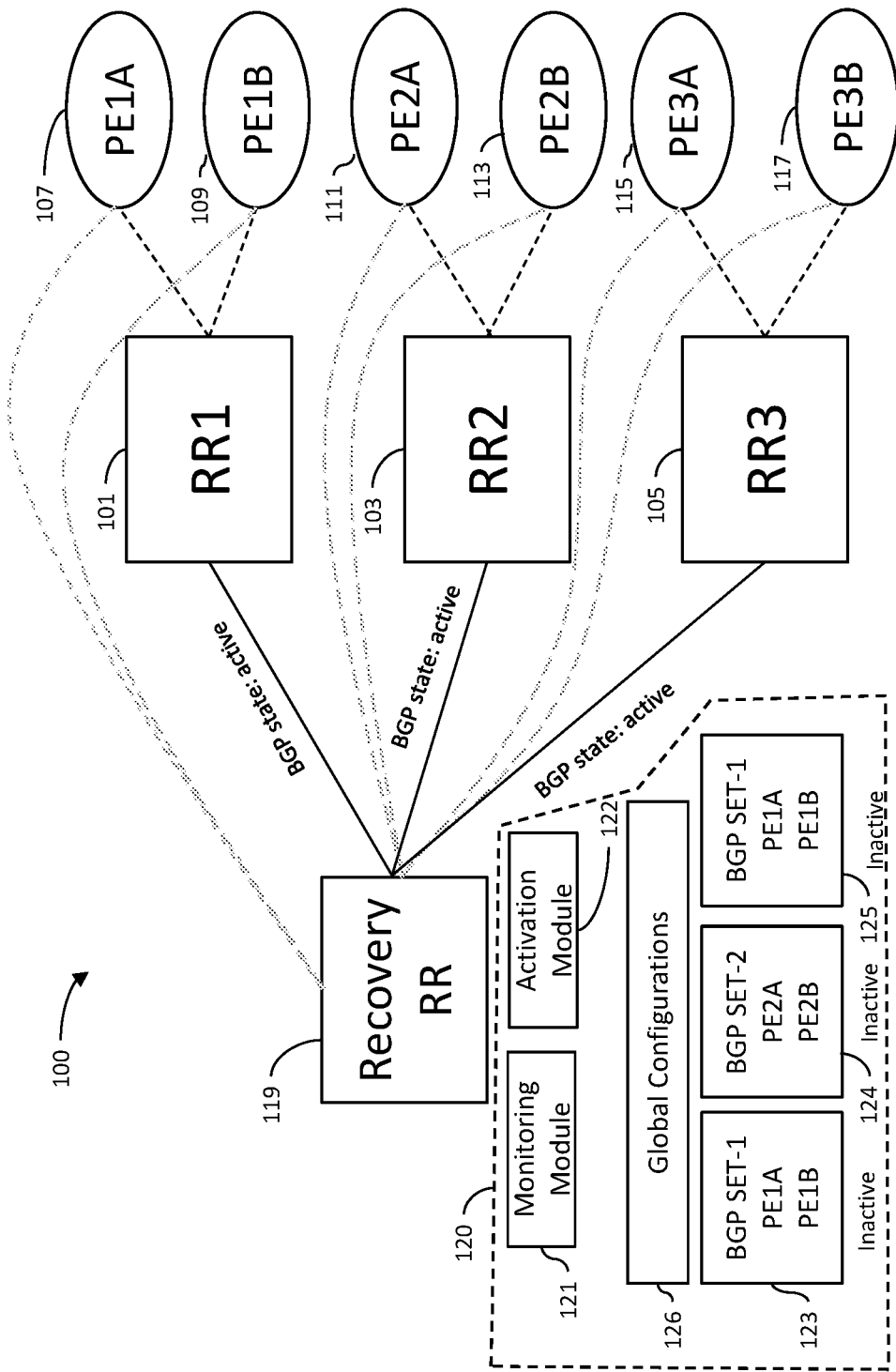
FIG. 1 is a block diagram illustrating the network environment of a system 100 for providing active recovery for a RR.

Artifact. An artifact is one of many kinds of tangible by-products produced during the development of software. Some artifacts (e.g., use cases, class diagrams, and other Unified Modeling Language (UML) models, requirements and design documents) help describe the function, architecture, and design of software.

Autonomous system (AS). On the Internet, an autonomous system (AS) is the unit of router policy, either a single network or a group of networks that is controlled by a common network administrator (or group of administrators) on behalf of a single administrative entity (such as a university, a business enterprise, or a business division). An autonomous system is also sometimes referred to as a routing domain. An autonomous system is assigned a globally unique number, sometimes called an Autonomous System Number (ASN). Networks within an autonomous system communicate routing information to each other using an Interior Gateway Protocol (IGP). An autonomous system shares routing information with other autonomous systems using the Border Gateway Protocol (BGP).

BGP Neighbor Sate. BGP forms a TCP session with neighbor routers called peers. BGP uses the Finite State Machine (FSM) to maintain a table of all BGP peers and their operational status. The BGP session may report in the following states: Idle; Connect; Active; OpenSent; OpenConfirm; Established. Idle is the first stage of the BGP finite state machine (FSM0. BGP detects a start event, tries to initiate a TCP connection to the BGP peer, and also listens for a new connect from a peer router. In the active state BGP starts a new three-way TCP handshake. If a connection is established an Open message is sent, the whole timer set for four minutes, and the state moves to open sent. In the established state the BGP section is established. BGP neighbors exchange routes via update messages. As update and keep alive messages are received the whole timer is reset. If the whole timer expires, an error is detected and BGP moves the neighbor back to the idle state.

BGP SET. BGP SET is a new artifact that groups BGP neighbors into a single logical container.

Border Gateway Protocol (BGP). BGP (Border Gateway Protocol) is protocol that manages how packets are routed across the internet through the exchange of routing and reachability information between edge routers. BGP directs packets between autonomous systems (AS)—networks managed by a single enterprise or service provider. Traffic that is routed within a single network AS is referred to as internal BGP, or iBGP. More often, BGP is used to connect one AS to other autonomous systems, and it is then referred to as an external BGP, or eBGP.

Container. A container is an isolated execution environment on a Linux host that behaves much like a full-featured Linux installation with its own users, file system, processes and network stack. Running an application inside of a container isolates it from the host and other containers, meaning that even when the applications inside of them are running as root, they cannot access or modify the files, processes, users, or other resources of the host or other containers. Containers have become popular due to the way they simplify the process of installing and running an application on a Linux server. Applications can have a complicated web of dependencies. The newest version of an application may require a newer version of a dependency than is available for the Linux distribution, and upgrading the dependency may break another application running on the server. However, since a container simulates a Linux environment, it becomes possible to install the dependencies in the container without causing any conflicts with the host. In fact, it's possible to run multiple containers at the same time, all with different versions of applications and libraries. Finally, containers are portable and can be shared across platforms. Docker, a popular container engine, has a specific format for containers to be stored in. This allows a developer to package a container with all of its dependencies, post it online and allow users to download and run the container right away.

Customer Edge Router. A CE router (customer edge router) is a router located on the customer premises that provides an Ethernet interface between the customer's LAN and the provider's core network. CE routers, P (provider) routers and PE (provider edge) routers are components in an MPLS (multiprotocol label switching) architecture. Provider routers are located in the core of the provider or carrier's network. Provider edge routers sit at the edge of the network. CE routers connect to PE routers and PE routers connect to other PE routers over P routers.

Loopback address. A loopback address is a type of IP address that is used to test the communication or transportation medium on a local network card and/or for testing network applications. Data packets sent on a loopback address are re-routed back to the originating node without any alteration or modification.

Provider Edge Router (PE Router). A Provider Edge router (PE router) is a router between one network service provider's area and areas administered by other network providers.

Route Reflector. A route reflector (RR) is a network routing component for BGP. It offers an alternative to the logical full-mesh requirement of internal border gateway protocol (IBGP). A RR acts as a focal point for IBGP sessions. The purpose of the RR is concentration. Multiple BGP routers can peer with a central point, the RR—acting as a RR server—rather than peer with every other router in a full mesh. All the other IBGP routers become RR clients.

Service-Aware Border Router (SABR). The SABR protocol is an extension of Contact Graph Routing that seeks to provide a routing solution for a wide range of scenarios that include both scheduled and discovered connectivity. For the scheduled connectivity regime, SABR uses a 'contact plan' provided by network management describing the current connectivity and future connectivity schedule. SABR then makes forwarding decisions based on an earliest-arrival-time metric where bundles are routed over the time-varying connectivity graph. SABR uses historical contact information and neighbor discovery to address routing over non-scheduled links.

FIG. 1 is a block diagram illustrating the network environment of a system 100 for providing active recovery for RRs. A plurality of primary RRs (RR1 101, RR2 103 and RR3 105) are peered with a plurality of edge devices (PE1A 107, PE1B 109, PE2A 111, PE2B 113, PE3A 115, and PE3B 117). The primary RRs may be virtual RRs. In the example illustrated in FIG. 1 only 3 primary RRs are shown. However, it is contemplated that a plurality of primary RRs (e.g. 5-50) may be used. Similarly, two provider edge devices are illustrated as being peered with each primary RR, but it is contemplated that a plurality of edge devices may be peered with each primary RR.

Primary RRs (RR1 101, RR2 103 and RR3 105) are also peered with a recovery RR 119 which may be a virtual RR. The recovery RR 119 include a recovery subsystem 120 including a monitoring module 121 and an activation module 122. The monitoring module 121 monitors the state of the BGP session to determine whether the state is active/established or idle/inactive. The monitoring module 121 checks the BGP session between the recovery RR 119 and the primary RRs periodically (e.g. every 5 seconds) to determine whether the BGP state is established/active or idle/inactive. When the state goes from established/active to idle/inactive the activation module 122 takes further action (establishes a peer relationship between the recovery RR 119 and the PEs supported by the inactive primary RR.

The recovery RR 119 must manage a copy of the differences on all primary RRs that it supports. Those differences are captured in a container labeled a BGP SET (e.g. BGP SET-1 123, BGP SET-2 124 and BGP SET-3 125). A BGP SET is a new artifact that resides in the recovery RR 119. Each primary RR that is protected places the unique configurations of the primary RR including all clients (PEs) that it supports and the IP addresses of those clients in a BGP SET. BGP SET is a new data artifact local to the recover RR 119. The BGP SET does not modify BGP adjacency (the establishment of a session between two BGP neighbors) or attributes distributed over the session. The neighbor would be a client of the Route reflector or a PE. So, the SET does not change the adjacency or the session itself between the two neighbors. The SET is designed to create a session or adjacency with the neighbors defined in the SET. Each BGP SET is a container and group-level session management function. The container includes all neighbor configuration, policies and parameters such as hold/keepalive settings. Each BGP SET must include a router ID/loopback address. Clients defined within the BGP SET must establish BGP peering with the BGP SET itself. Although only three BGP SETs are illustrated in FIG. 1, the recovery RR 119 may have any number of BGP SETs (typically anywhere between 5 to 50 BGP SETs). Each SET represents a different primary RR configuration.

The recovery RR 119 may also access global configurations 126 which are the configurations that are common between the primary RRs (RR1 101, RR2 103 and RR3 105). Each BGP SET will inherit all global configurations (e.g. subsequent address family (SAFI, L3VPN, L2VPN), autonomous system number (ASN), interior gateway protocol (IGP) and policies).

There are different categories of RRs—intra, inter and SABR. The recovery RR 119 must be classified as one of the above (either intra, inter or SABR). The recovery RR 119 must be of the same category of the primary RRs that it services.

Figure 2:
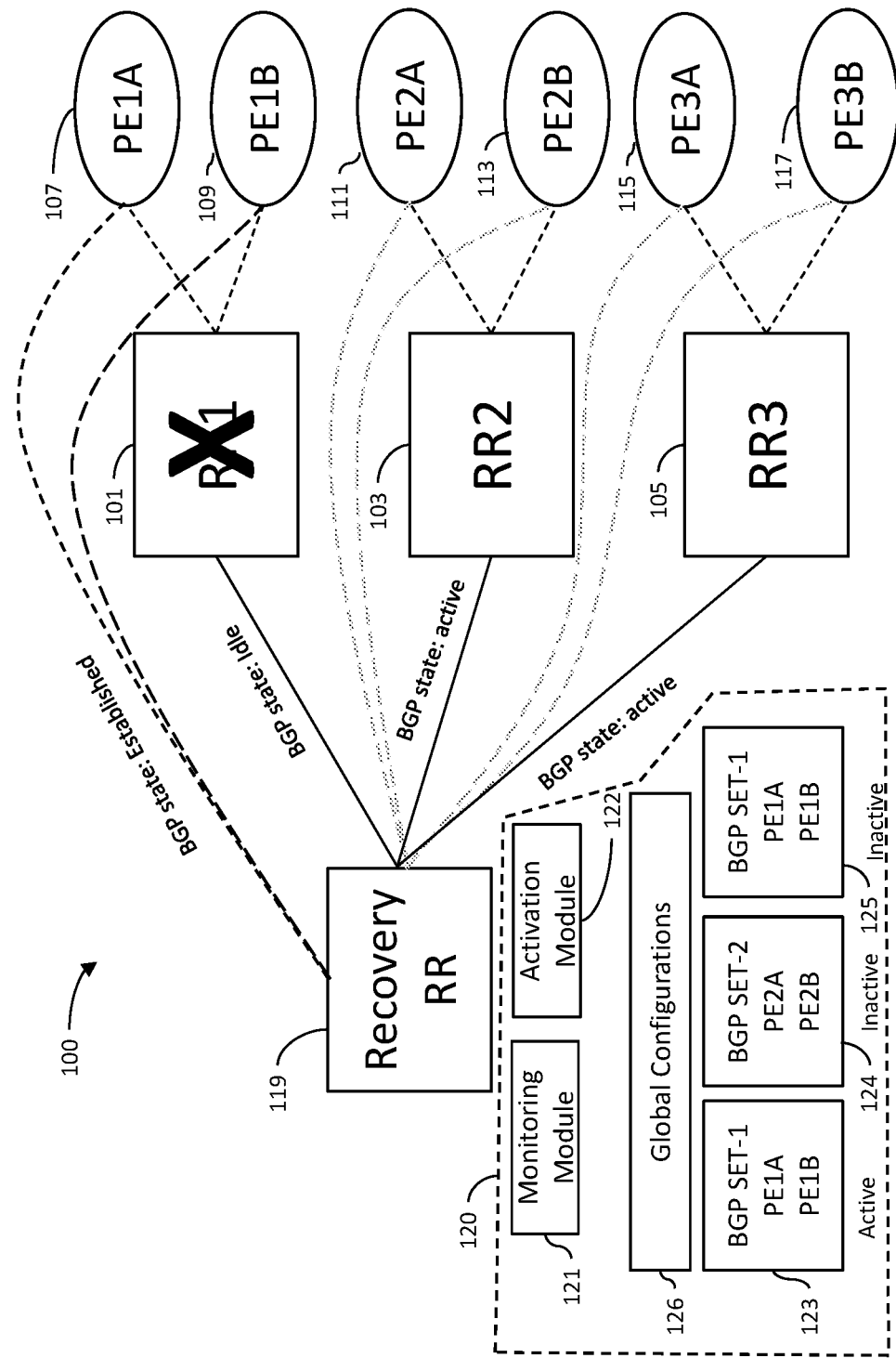
FIG. 2 is a block diagram illustrating the network environment of a system 100 for providing active recovery for a RR when a primary RR fails.

The operation of the system is illustrated in FIGS. 1 and 2. As shown in FIG. 1 RR1 101 supports PE1A 107 and PE1B 109, RR2 103 supports PE2A 111 and PE2B 113 and RR3 105 supports PE3A 115 and PE3B 117. When the primary RRs are operational the BGP state between the recovery RR 119 and the primary RRs (RR1 101, RR2 103 and RR3 105) are all active, and BGP SET-1 123, BGP SET-2 124 and BGP SET-3 125 are all inactive. In that case no connections exist between the PEs and the recovery RR 109.

FIG. 2 illustrates what happens when a primary RR (e.g. RR1 101) fails. In that case, the BGP state between the recovery RR 119 and RR1 101 is idle. The change of BGP state is the trigger used by the activation module 122 on the recovery RR 119 to activate a peer relationship with the set of PEs (e.g. PE1A 107 and PE1B 109) associated with the primary RR (RR1 101) that failed. In the event of an outage of a protected RR, the BGP SET of the affected primary RR becomes active and the Loopback address of the affected peer is used to build BGP sessions to each client (PE) defined in the BGP SET. The activation module 122 will access BGP SET-1 123 which will become active. The BGP SET manages the BGP state for all neighbors defined within the SET, with the BGP state being either up or shutdown. The BGP SET container has all the neighbor (PE) configurations contained in it and can define all sessions as either up (sessions are established) or shutdown (none of the sessions are established). Unlike existing BGP sessions where the state is managed on a per session basis the BGP SET is managed for all BGP neighbors within the BGP SET. The recovery RR 119 maintains the BGP global configuration 126 which are the common configurations of the primary RRs. The recovery RR 119 can manage multiple BGP SETs where each set represents a client (PE) group on a protected primary RR. A BGP SET defines the differences in configurations which is limited to the neighbor IP address for BGP session establishment. On a given router there may be multiple BGT SETs. For example, a router may have three BGP SETs. The difference between those BGP SETs is essentially the neighbor address of the clients to which those BGP SETs report. So, for example a BGP SET 1 may be a BGP SET for routers 1-10. In BGP SET 2, the BGP SET supports routers 11-20 with the PE addresses of routers 11-20. In BGP SET 3 the BGP SET supports routers 21-30 with the PE addresses of routers 21-30. The BGP SET also maintains the router-ID/Loopback address for each protected PE. When the failed primary RR returns to an established state the recovery router disables its BGP SET returning to active monitoring mode.

Figure 3:
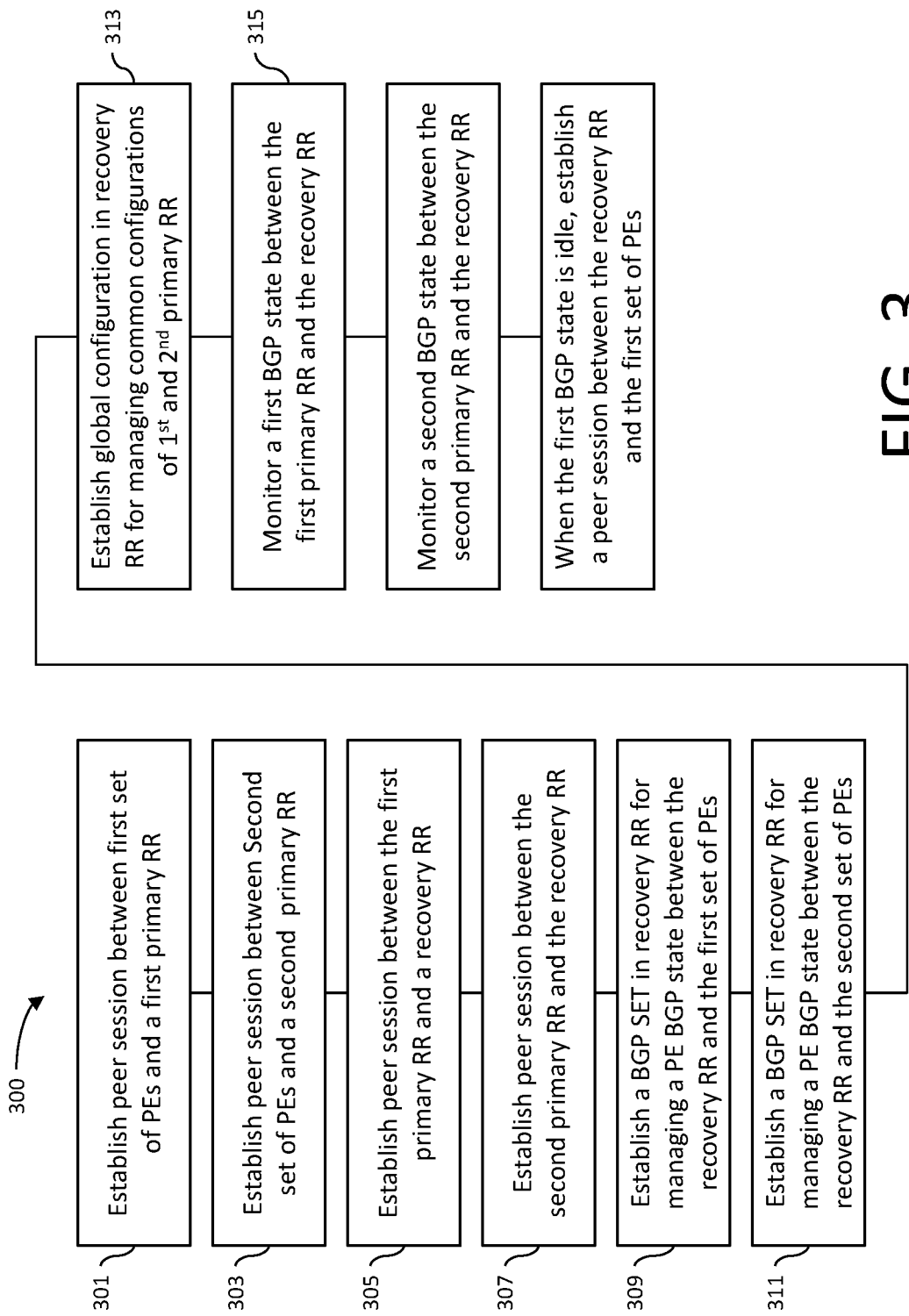
FIG. 3 is a flowchart of a method for providing active recovery for a RR.

Illustrated in FIG. 3 is a flowchart for a method 300 for establishing high resilient active recovery for primary RRs.

In step 301, the method 300 establishes a peer session between a first set of PEs and a first primary RR.

In step 303, the method 300 establishes a peer session between the second set of PEs and a second primary RR.

In step 305, the method 300 establishes a peer session between the first primary RR and a recovery RR.

In step 307, the method 300 establishes a peer session between the second primary RR and the recovery RR.

In step 309, the method 300 establishes a BGP SET in the recovery RR for managing a PE BGP state between the recovery RR and the first set of PEs In step 311, the method 300 establishes a BGP SET in the recovery RR for managing a PE BGP state between the recovery RR and the second set of PEs In step 313, the method 300 establishes a global configuration in the recovery RR for managing the common configurations of the first primary RR and the second primary RR.

In step 315, the method 300 monitors a first BGP state between the first primary RR and the recovery RR.

In step 317, the method 300 monitors a second BGP state between the second primary RR and the recovery RR.

In step 319, the method 300 establishes a peer session between the recovery RR in the first set of PEs when the first BGP state is idle as a result of the failure of the first primary RR.

Figure 4:
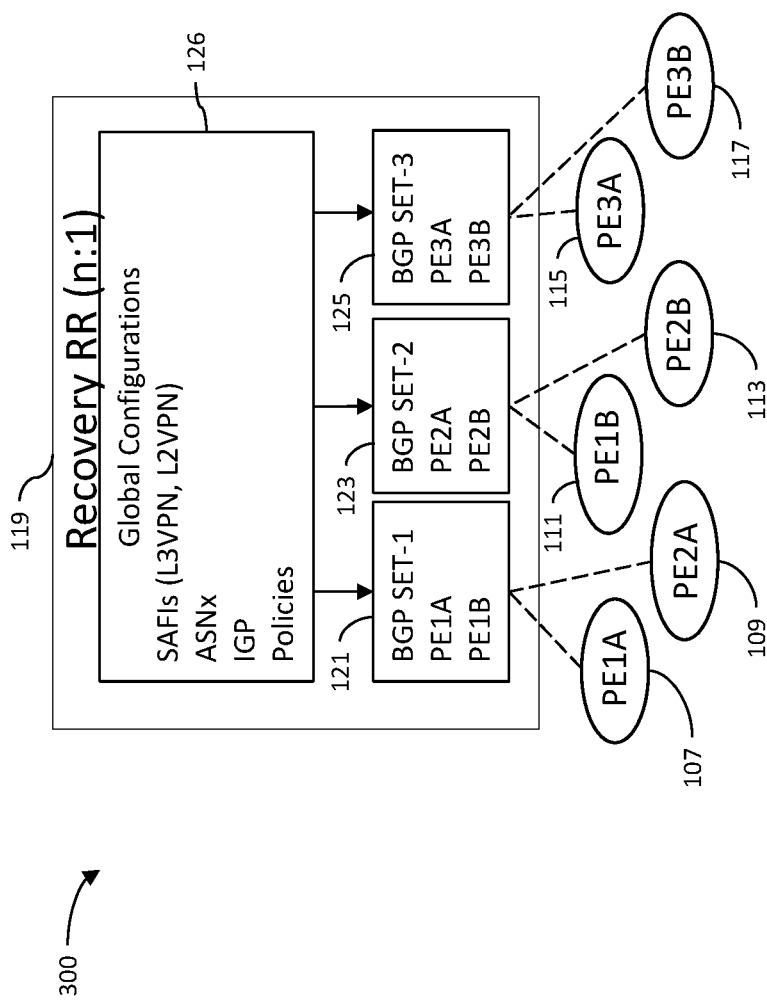
FIG. 4 is a Block diagram illustrating the configuration of a recovery RR.

FIG. 4 illustrates the configuration 300 of the recovery RR 119. The recovery RR 119 includes global configurations 126 which are the configurations that are common between the primary RRs (RR1 101, RR2 103 and RR3 105). The common configurations may include Subsequent Address Family Identifiers (SAFIs) associated with a level 2 VPN and a Level 3 VPN; Autonomous system numbers (ASN); interior gateway protocol (IGP) and policies. The Recovery RR 119 also include a plurality of containers (BGP SET-1 121, BGP SET-2 123; and BGP SET-3 125).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

What is claimed:

1. A method comprising:
    establishing a first peer session between a recovery route reflector and a first route reflector;
    establishing a second peer session between the recovery route reflector and a second route reflector;
    monitoring a routing protocol state between the first route reflector and the recovery route reflector; and
    when the routing protocol state is idle, establishing a peer session between the recovery route reflector and a first set of provider edge devices.

2. The method of claim 1, further comprising establishing a BGP SET in the recovery route reflector that manages a first provider edge BGP state between the recovery route reflector and the first set of provider edge devices.

3. The method of claim 2, wherein the BGP SET is a container that comprises neighbor configuration policies and parameters.

4. The method of claim 2, wherein the BGP SET comprises a router ID or loopback address.

5. The method of claim 2, further comprising establishing BGP peering with the BGP SET.

6. The method of claim 1, wherein the recovery route reflector is a virtual route reflector.

7. The method of claim 1, wherein the first set of provider edge devices are routers.

8. A system comprising:
    one or more processors; and
    memory coupled with the one or more processors, the memory storing executable instructions that when executed by the one or more processors cause the one or more processors to effectuate operations comprising:
        establishing a first peer session between a recovery route reflector and a first route reflector;
        establishing a second peer session between the recovery route reflector and a second route reflector;
        monitoring a routing protocol state between the first route reflector and the recovery route reflector; and
        when the routing protocol state is idle, establishing a peer session between the recovery route reflector and a first set of provider edge devices.

9. The system of claim 8, further comprising establishing a BGP SET in the recovery route reflector that manages a first provider edge BGP state between the recovery route reflector and the first set of provider edge devices.

10. The system of claim 9, wherein the BGP SET is a container that comprises neighbor configuration policies and parameters.

11. The system of claim 9, wherein the BGP SET comprises a router ID or loopback address.

12. The system of claim 9, further comprising establishing BGP peering with the BGP SET.

13. The system of claim 8, wherein the recovery route reflector is a virtual route reflector.

14. The system of claim 8, wherein the first set of provider edge devices are routers.

15. A non-transitory computer readable storage medium storing computer executable instructions that when executed by a computing device cause said computing device to effectuate operations comprising:
    establishing a first peer session between a recovery route reflector and a first route reflector;
    establishing a second peer session between the recovery route reflector and a second route reflector;
    monitoring a routing protocol state between the first route reflector and the recovery route reflector; and
    when the routing protocol state is idle, establishing a peer session between the recovery route reflector and a first set of provider edge devices.

16. The non-transitory computer readable storage medium of claim 15, further comprising establishing a BGP SET in the recovery route reflector that manages a first provider edge BGP state between the recovery route reflector and the first set of provider edge devices.

17. The non-transitory computer readable storage medium of claim 16, wherein the BGP SET is a container that comprises neighbor configuration policies and parameters.

18. The non-transitory computer readable storage medium of claim 16, wherein the BGP SET comprises a router ID or loopback address.

19. The non-transitory computer readable storage medium of claim 16, further comprising establishing BGP peering with the BGP SET.

20. The non-transitory computer readable storage medium of claim 15, wherein the recovery route reflector is a virtual route reflector.

* * * * *